United States Patent
Shimazaki et al.

(10) Patent No.: US 6,711,473 B2
(45) Date of Patent: Mar. 23, 2004

(54) PARKING ASSISTING DEVICE

(75) Inventors: Kazunori Shimazaki, Aichi-ken (JP); Tomio Kimura, Aichi-ken (JP); Satoshi Yamada, Aichi-ken (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 10/176,459

(22) Filed: Jun. 21, 2002

(65) Prior Publication Data

US 2002/0198634 A1 Dec. 26, 2002

(30) Foreign Application Priority Data

Jun. 22, 2001 (JP) .......................................... 2001-189645

(51) Int. Cl.[7] ................................................ G06F 7/00
(52) U.S. Cl. ........................................................ 701/1
(58) Field of Search ................................. 701/1; 180/204, 180/199; 348/113, 118; 340/932.2

(56) References Cited

FOREIGN PATENT DOCUMENTS

| DE | WO 01/14941 A1 | * 8/2000 | ............ G05D/1/02 |
|---|---|---|---|
| JP | 59-114193 | 7/1984 | ............ B60R/1/00 |

* cited by examiner

*Primary Examiner*—Yonel Beaulieu
(74) *Attorney, Agent, or Firm*—Morgan & Finnegan, LLP (57) ABSTRACT

A parking assisting device is provided with: a yaw rate sensor for detecting a yaw angle of a vehicle; a controller having a navigation function control unit and a parking assisting function control unit; a function selecting switch for determining switching to a parking assisting mode from a navigation mode; a monitor for providing navigation information, as well as for setting the reference position of the yaw angle and selecting a parking mode; and a speaker for providing parking assisting information to a driver in accordance with a vehicle position specified on the basis of the yaw angle.

10 Claims, 8 Drawing Sheets

PARKING ASSISTING DEVICE

BACKGROUND OF THE INVENTION

1. Field of the Invention

The present invention relates to a parking assisting device.

2. Description of the Related Art

Conventionally, there has been proposed a device for displaying a rear view of a vehicle on a monitor if a driver becomes unable to see a target place due to a blind spot of the vehicle when it is moving backward. For example, JP-2-036417 B discloses a rear watch monitor device for a vehicle, consisting of a television camera for taking the rear view of a vehicle, a monitor television for displaying a video image taken by this television camera, a sensor for outputting an information signal relating to a tire steering angle and a circuit for generating a marker signal in response to an information signal from the sensor and superimposing by displaying a marker on a television screen. In this device, steering angle data of tires and marker position data along the backward direction of a vehicle corresponding to the steeling angle are accumulated in a ROM and an estimated backward track of the vehicle corresponding to the steering angle at that time is superimposed on a video image taken by the television camera to be displayed on the television screen as a line of the marker.

According to such a device, since an estimated backward track of a vehicle corresponding to a steering angle is displayed on the screen of the monitor television together with a rear view such as a state of a road behind a vehicle when the vehicle is moving backward, a driver is able to operate a steering wheel to move the vehicle backward while keeping an eye on the television screen without turning backward.

However, when performing lateral parking or parallel parking, for example, with the conventional rear watch monitor device, it is difficult to determine when and by how much steering angle the driver should turn the steering wheel to conduct parking, by simply looking at a rear view of the vehicle and an estimated backward track of the vehicle on the television screen, thereby leading to a problem that it is impossible to attain satisfactory parking assistance.

Also, the driver has to turn the steering wheel while looking at the television screen with the conventional rear watch monitor device. However, the driver also has to check safety regarding the surroundings of a vehicle. Therefore, there is another problem in that a heavy load is placed on a driver.

Further, nowadays, a lot of vehicles install a navigation system that provides guide information for reaching the destination. Therefore, if the existing human-machine-interfaces such as a voice input, a voice output, an image display, and switches, and the existing control units of the navigation system are employed to achieve parking assistance, it is preferable in terms of the cost or the simplicity of the construction.

SUMMARY OF THE INVENTION

The present invention has been made in view of the above, and an object of the present invention is therefore to provide a parking assisting device, which can properly guide the driving operations for parking without placing a heavy load on a driver and can be easily integrated with a navigation system.

For achieving the above-described object, the parking assisting device according to the present invention is characterized by comprising: a first means for detecting a yaw angle of a vehicle; a controller having a navigation function control unit and a parking assisting function control unit; a second means for determining switching from a navigation mode to a parking assisting mode; a third means for providing navigation information, as well as for setting the reference position of the yaw angle and selecting a parking mode; and a fourth means for providing parking assisting information to a driver in accordance with the vehicle position specified on the basis of the yaw angle.

The parking assisting information preferably includes information instructing a driver to move a vehicle forward or backward while keeping a constant steering angle, and to stop the vehicle and then perform steering to the opposite direction to move the vehicle backward while keeping a constant steering angle, so that the vehicle is finally parked in the target parking space.

The above-described parking assisting device may be provided with a fifth means for receiving by voice input a navigation function instruction, a setting instruction of reference position of the yaw angle, and a selection instruction of the parking mode, instead of the third means or with the third means.

Also, the controller preferably includes a voice generation function unit for giving voice-guidance on the navigation information and on the information related to the parking mode that is selected by the third means or the fifth means.

It is preferable that the third means and the fifth means can perform the selection of the parking mode, such as selecting between parallel parking and lateral parking, or selecting between left-side parking and right-side parking.

The parking assisting device may further be provided with an alarm generating sensor for giving an alarm from the fourth means.

The parking assisting device may be constructed such that it is further provided with a backward-movement shift signal detection unit, and the controller makes a judgment whether desired proper vehicle turning operations are being performed, by taking into consideration the backward-movement shift signal, and then the fourth means provides the parking assisting information indicating whether the desired, proper vehicle turning operations are being conducted.

DETAILED DESCRIPTION OF THE PREFERRED EMBODIMENTS

The embodiments according to the present invention will be described below with reference to attached drawings.

Embodiment 1

Figure 1:
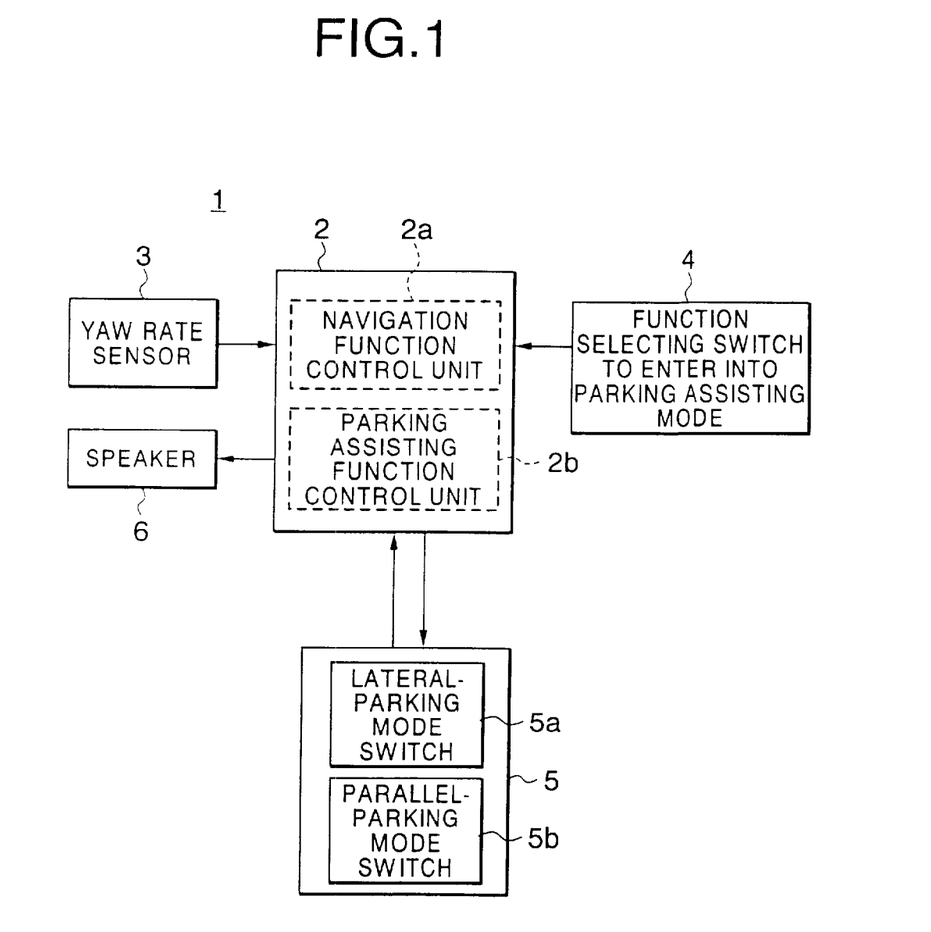
FIG. 1 is a diagram showing a construction of a parking assisting device according to Embodiment 1 of the present invention.

FIG. 1 shows a construction of a parking assisting device according to Embodiment 1 of the present invention. The parking assisting device 1 includes: a controller 2; and a yaw rate sensor 3, a function selecting switch 4, a monitor 5, and a speaker 6, each of which is connected to the controller 2.

First, the yaw rate sensor 3 is used for detecting an angular speed in the direction of the yaw angle of a vehicle, and it employs an existing sensor in a navigation system. The function selecting switch 4 is used for giving to the controller 2 an instruction for switching to a parking assisting mode from a navigation mode. In Embodiment 1, the function selecting switch 4 is newly provided as a dedicated switch, being separate from the navigation system. (See FIG. 1) Instead of using the dedicated switch, the function selecting switch 4 may be an existing switch such as a function switch of the navigation system, or a touch switch provided on the screen of the monitor 5. The monitor 5 employs an existing monitor in the navigation system, and it is capable of displaying images of navigation information such as map information, position information, and steering information. The monitor 5 can further perform the image display of touch switches, which consist of a lateral-parking mode switch 5a and a parallel-parking mode switch 5b for selecting a vehicle parking mode and giving that information to the controller 2. Incidentally, the navigation information display and the touch switch display are selectable display modes which can be switched with the function selecting switch 4. The speaker 6 uses an existing speaker in a car stereo or the navigation system.

The interior of the controller 2 is provided with a navigation function control unit 2a and a parking assisting function control unit 2b. That is, the controller 2 is a unit in which a parking assisting function control unit is incorporated in an existing controller of the navigation system. For example, by adding software for realizing a parking assisting function to the controlling software of the existing navigation system, the controller 2 can be constructed without addition of hardware.

The parking assisting function control unit 2b of the controller 2 is provided with a CPU, a ROM storing control programs, and a working RAM, which are not shown. The ROM stores a target angle necessary for the parking operation, which is obtained from a minimum turning radius Rc at the time when the steering wheel of a vehicle is steered to the maximum to turn the vehicle. The ROM also stores control programs for performing the parking assistance in lateral parking and parallel parking. The CPU operates on the basis of the control programs stored in the ROM. The controller 2 calculates a yaw angle and a turning angle of the vehicle from the vehicle angular speed that is inputted by the yaw rate sensor 3, and the information with regard to an operation and operation timing for each of steps to be performed during a parking operation is output to the speaker 6.

Here, what kind of track the parking assisting device of this embodiment causes a vehicle to draw to assist parking will be described.

First, the case in which lateral parking is performed will be described with reference to FIG. 2. In the lateral parking, a vehicle reversed into the perpendicular parking space.

A central point of an entrance in a parking space T where a vehicle 10 is to be parked is assumed to be the origin O, the Y axis is taken in the direction perpendicular to a road, which is the backward direction of the vehicle 10 in the parking space T, and the X axis is taken in parallel with the road, that is, perpendicular to they axis. In addition, a width of a parking frame in the parking space T is assumed to be W1. The parking assisting device is assumed to assist a driver so that the vehicle 10 is appropriately parked in a vehicle position H1 where a rear axle center HO is in the center in the width direction of the parking space T and is in parallel to the length direction of the parking space T.

First, it is assumed that the vehicle 10 is parked in a vehicle position E1 which is perpendicular to the parking space T1 and where a rear axle center EO of the vehicle 10 is at a distance of D from the entrance of the parking space T and a side portion T1 of the parking space T and a position DR of the driver of the vehicle 10 coincide with each other.

Next, it is assumed that the vehicle 10 in a vehicle position E1 advances to a turning angle θ while turning at a radius Rc with the steering angle of the steering wheel at the maximum leftward; when the vehicle 10 reaches a vehicle position F1, moves backward by a turning angle φ while turning at a turning radius Rc with the steering angle of the steering wheel at the maximum rightward; and further moves backward with the steering wheel returned to a straight forward state in a vehicle position G1 where the vehicle 10 is in parallel with the parking space T to appropriately park in a vehicle position H1 in the parking space T.

In addition, rear axle centers in the vehicle positions E1, F1 and G1 are assumed to be EO, FO and GO, respectively.

Here, when a distance in the X axis direction between the position DR of the driver and the rear axle center EO in the vehicle position E1 is assumed to be L, coordinates (C1x, C1y) of a turning center C1 at the time when the vehicle 10 turns from the vehicle position E1 to the vehicle position F1 are represented by the following expressions.

$$C1x = L - W1/2$$

$$C1y = -(D + Rc)$$

Coordinates (C2x, C2y) of a turning center C2 at the time when the vehicle 10 turns from the vehicle position F1 to the vehicle position G1 are represented by the following expressions.

$$C2x = -(Rc + Rc) \cdot \sin\theta + C1x = -2Rc \cdot \sin\theta + L - W1/2$$

$$C2y = (Rc + Rc) \cdot \cos\theta + C1y = 2Rc \cdot \cos\theta - (D + Rc)$$

Here, the X coordinate C2x is also represented by the following expression.

$$C2x = -Rc$$

sin θ is represented by the following expression from two relational expressions of the X coordinate C2x.

$$\sin\theta = (Rc + L - W1/2)/2Rc$$

The value of θ can be calculated using the known Rc, L and W1. The controller 2 stores the value of θ as the set value θ.

Moreover, the turning angle φ at which the vehicle 10 turns from the vehicle position F1 to the vehicle position G1 is represented by the following expression.

$$\phi = \pi/2 - \theta$$

Next, operations of the parking assisting device in accordance with this embodiment at the time of lateral parking will be described.

First, a driver stops the vehicle 10 in the vehicle position E1 to actuate the function selecting switch 4 so that the lateral-parking mode switch 5a and parallel-parking mode switch 5b are displayed on the monitor screen. Then, when the driver touches the lateral-parking mode switch 5a, the controller 2 sets the vehicle position E1 as a position where the yaw angle of the vehicle is zero degree. Next, the driver steers the steering wheel to the maximum leftward to bring it to the fully turned state and advances the vehicle 10 in that state.

The controller 2 calculates a yaw angle of the vehicle from an angular speed of the vehicle 10 inputted from the yaw rate sensor 3 and compares it with the set value θ. As the vehicle 10 approaches the vehicle position F1 from the vehicle position E1, the controller 2 informs the driver of approach information notifying that the vehicle has approached the vehicle position F1 and arrival information notifying that the vehicle has reached the vehicle position F1 based on the difference between the yaw angle and the set value θ via speaker 6.

For example, the speaker 6 emits intermittent beeping sounds as the approach information. The cycle of this intermittent sounds becomes shorter as the difference between the yaw angle and the set value θ is reduced. When there is no difference between the yaw angle and the set value θ, speaker 6 emits a continuous beeping sound as the arrival information.

The driver stops the vehicle 10 in the vehicle position F1 in accordance with the arrival information. Next, the driver steers the steering wheel to the maximum rightward to bring it to the fully turned state and moves the vehicle 10 backward in that state. As the yaw angle of the vehicle 10 approaches 90 degrees, the controller 2 informs the driver of approach information notifying that the vehicle 10 has approached the vehicle position G1 in parallel with the parking space T and of arrival information notifying that the vehicle 10 has reached the vehicle position G1, via the speaker 6. The driver returns the steering wheel to the straight forward state and then moves the vehicle 10 backward, and completes the parking when the vehicle 10 is placed in the parking space T.

Next, a case where parallel parking is performed will be described with reference to FIG. 3.

It is assumed that the vehicle 10 is parked in the parking space T such that the rear left end of the vehicle 10 coincides with a corner S2 in the back of the parking space T. A rear axle center MO of the vehicle 10 in a vehicle position M1 in this state is assumed to be the origin, and the Y axis is taken in the direction parallel with a road, which is the backward direction of the vehicle 10 and the X axis is taken perpendicular to the Y axis. In addition, coordinates at the corner in the back of the parking space T are assumed to be S2(W2/2, a2). Here, a2 and W2 denote a rear overhang and a vehicle width of the vehicle 10, respectively.

It is assumed that the vehicle 10 in a vehicle position J1 advances while turning at the radius Rc with the steering angle of the steering wheel at the maxim rightward; when the vehicle 10 reaches a vehicle position K1, it moves backward while turning at the radius Rc with the steering angle at the maximum leftward; and, when the vehicle reaches a vehicle position L1, it moves back while turning at the radius Rc with the steering angle at the maximum rightward to appropriately park the vehicle in the vehicle position M1 in the parking space T.

First, it is assumed that parallel parking is started with a vehicle 20 parked in a predetermined position in front of the parking space T as a mark and a state in which the vehicle 10 is stopped in a vehicle position J1 as an initial stopped position.

The vehicle position J1 is assumed to be a position where the Y coordinate of the position DR of the driver of the vehicle 10 coincides with the Y coordinate of a rear end 20a of the parked vehicle 20, which is a position in parallel with the parking space T and a position where the vehicle 10 and the vehicle 20 are a predetermined distanced apart. Therefore, coordinates (JOx, JOy) of a rear axle center JO of the vehicle position J1 are unconditionally defined from the relation between the coordinates of the rear end 20a of the vehicle 20 and the rear axle center JO and the vehicle distance d.

The vehicle 10 in the vehicle position J1 advances to the vehicle position K1 while turning at the radius Rc with the steering angle of the steering wheel at the maximum rightward. In this case, a turning center is assumed to be C3 and a turning angle is assumed to be β. In addition, the vehicle 10 in the vehicle position K1 moves backward to the vehicle position L1 while turning at the radius Rc with the steering angle at the maximum leftward. In this case, a turning center is assumed to be C4 and a turning angle is assumed to be δ. Moreover, the steering wheel is turned in the opposite direction in the vehicle position L1 and the vehicle 10 moves backward to the vehicle position M1 while turning at the radius Rc with the steering angle at the maximum rightward. In this case, a turning center is assumed to be C5 and a turning angle is assumed to be α.

In addition, rear axle centers in the vehicle positions K1 and L1 are assumed to be KO and LO, respectively.

The turning angles α, β and δ have the following relation.

$$\delta = \alpha - \beta$$

Coordinates (C5x, C5y) of the turning center C5 are represented by the following expressions.

$$C5x = -Rc$$

$$C5y = 0$$

Coordinates (C4x, C4y) of the turning center C4 are represented by the following expressions.

$$C4x = C5x + (Rc+Rc) \cdot \cos\alpha = -Rc + 2Rc \cdot \cos\alpha$$

$$C4y = C5y - (Rc+Rc) \cdot \sin\alpha = -2Rc \cdot \sin\alpha$$

Coordinates (C3x, C3y) of the turning center C3 are represented by the following expressions.

$$C3x = C4x - (Rc+Rc) \cdot \cos\beta = -Rc + 2Rc \cdot \cos\alpha - 2Rc \cdot \cos\beta$$

$$C3y = C4y + (Rc+Rc) \cdot \sin\beta = 2Rc \cdot \sin\alpha + 2Rc \cdot \sin\beta$$

In addition, coordinates (JOx, JOy) of the rear axle center JO of the vehicle position J1 are represented by the following expressions.

$$JOx = -Rc \cdot (1-\cos\alpha) - Rc \cdot (1-\cos\alpha - 1 + \cos\beta) + Rc \cdot (1-\cos\beta) \quad (1)$$
$$= 2Rc \cdot (\cos\alpha - \cos\beta)$$

$$JOy = -Rc \cdot \sin\alpha - Rc \cdot (\sin\alpha - \sin\beta) + Rc \cdot \sin\beta \quad (2)$$
$$= 2Rc \cdot (\sin\beta - \sin\alpha)$$

Here, when the above expressions (1) and (2) are transformed using a formula of the trigonometric functions, the following expressions are obtained.

$$\tan(\alpha/2 + \beta/2) = JOx/JOy$$

$$\sin^2(\alpha/2 - \beta/2) = (JOx^2 + JOy^2)/(16Rc^2)$$

α and β can be calculated using the coordinates (JOx, JOy) of the known rear axle center JO and these values are stored in the controller 2 as set values α and β.

The coordinates (Jox, Joy) of the rear axle center JO use, for example, the values of Jox=2.3 m and Joy=4.5 m as values that would allow the vehicle 10 to be parked on behind the vehicle 20 through natural parking operation.

It is desirable to change the values of the coordinates JOx and JOy of the rear axle center JO according to the grade, the steering property and the like of the vehicle 10.

Next, operations of the parking assisting device in accordance with this embodiment at the time of parallel parking will be described.

First, a driver stops the vehicle 10 in the vehicle position J1 such that the Y coordinate of the position DR of the driver coincides with the Y coordinate of the rear end 20a of the parked vehicle 20 and the vehicle 10 is the distance d apart from the vehicle 20. Here, first, the function selecting switch 4 is actuated to display the lateral-parking mode switch 5a and the parallel-parking mode switch 5b on the monitor screen. Then, after touching the parallel-parking mode switch 5b, the controller 2 sets the vehicle position J1 as the position where the yaw angle of a vehicle is zero degree, and it starts the programs for parallel parking. Next, a driver turns a steering wheel of the vehicle 10 to the maximum rightward to bring it to the fully-turned state, and the vehicle is moved forward in that state. The controller 2 calculates the yaw angle of the vehicle from the angular speed of the vehicle 10, which is inputted by the yaw rate sensor 3, and it compares the yaw angle with the set value β. As the vehicle 10 approaches a vehicle position K1 from a vehicle position J1, the controller 2 informs the driver of approach information indicating that the vehicle has approached the vehicle position K1 and of arrival information indicating that the vehicle has reached the vehicle position K1 through the speaker 6 on the basis of the difference between the yaw angle and the set value θ, in a manner similar to the case of parallel parking.

The driver stops the vehicle 10 in the vehicle position K1 in accordance with the arrival information. Next, the driver steers the steering wheel to the maximum leftward to bring it to the fully turned state and moves the vehicle 10 backward in that state. The controller 2 compares the yaw angle of the vehicle against the set value α(=β+δ). As the vehicle 10 approaches the vehicle position L1 from the vehicle position K1, that is, as the yaw angle of the vehicle approaches the set value α, the controller 2 informs the driver of approach information notifying that the vehicle has approached the vehicle position L1 and arrival information notifying that the vehicle has reached the vehicle position L1 based on the difference between the yaw angle and the set value α via speaker 6 in the same manner as at the time of lateral parking.

A driver stops the vehicle 10 at the vehicle position L1 in accordance with the arrival information. Next, the driver turns the steering wheel in an opposite direction at the vehicle position L1, and performs the steering to the maximum rightward to bring it to the fully-turned state. Then, the vehicle 10 is moved backward in that state. As the yaw angle of the vehicle 10 approaches zero degree, the controller 2 informs the driver of approach information indicating the approach of the vehicle 10 to a vehicle position M1 in a parking space T and of arrival information indicating that the vehicle has reached the vehicle position M1, through the speaker 6. Accordingly, the driver stops the vehicle 10 at the vehicle position M1, thereby completing the parking.

Note that, the yaw rate sensor is employed to detect the yaw angle in Embodiment 1. However, as the method for detecting the yaw angle, there may be used a method using a position gyro or a method using the rotation gap between the left wheel and the right wheel, to each of which a rotation sensor is attached. Further, methods using a geomagnetic sensor or a GPS system may be also employed.

The means for informing the driver of the approach information and of the arrival information is not limited to the speaker 6. Other means for providing auditory information, visual information or tactile information may be also used. Additionally, voice instructions may be given by the speaker 6. Further, in the approach information and the arrival information, the volume and the melody of the sound given from the speaker 6 may be changed or the information delivered by the voice instructions may be varied for each target vehicle position for approach or arrival.

Thus, in the parking assisting device according to Embodiment 1, it becomes possible to appropriately assist parking and accurately guide the driving operation for parking without placing a heavy load on the driver. Also, the parking assisting function is integrated with the navigation system. Therefore, it is possible to use the existing human-machine-interface or the existing control units of the navigation system, to thereby achieve the parking assisting function by simply modifying the software with no addition of hardware. Thus, the parking assisting device is extremely preferable in terms of the cost or the simplicity of its construction.

Embodiment 2

Figure 4:
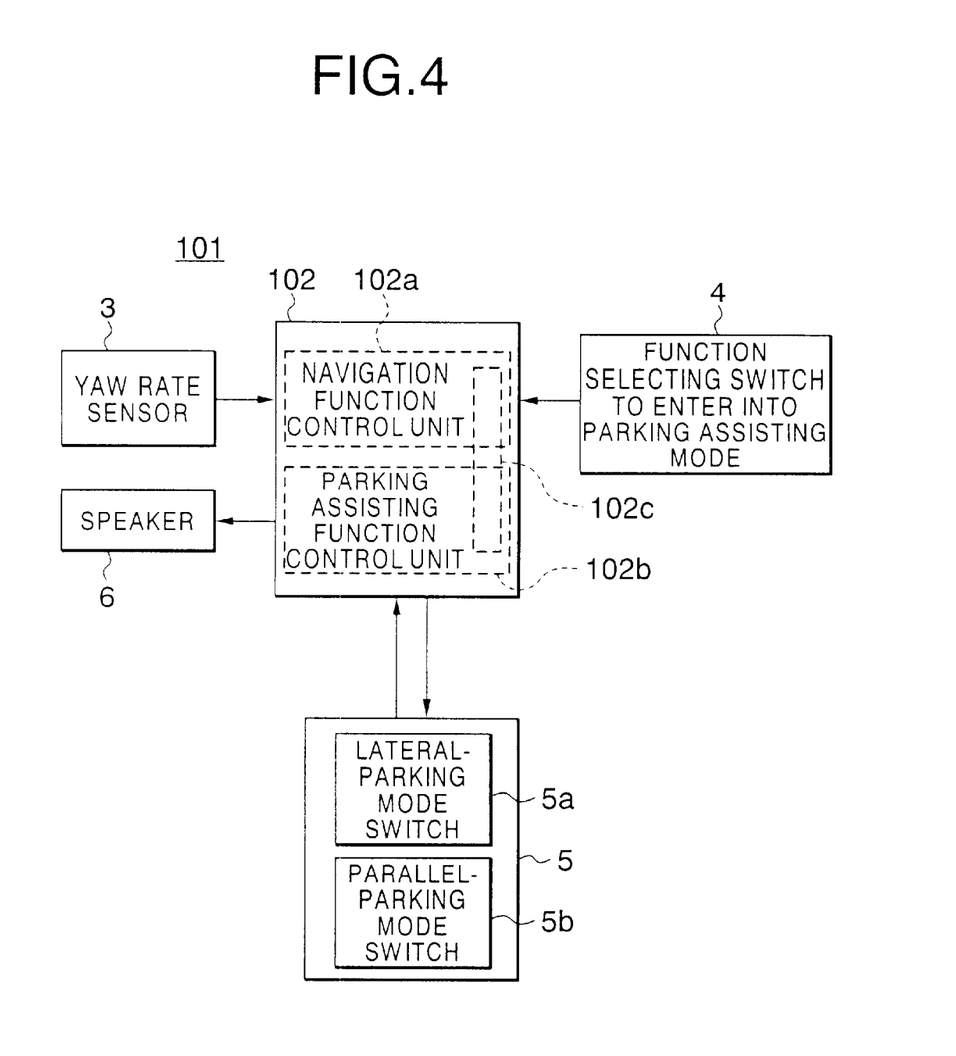
FIG. 4 is a diagram showing a construction of a parking assisting device according to Embodiment 2 of the present invention.

Next, a parking assisting device according to Embodiment 2 of the present invention will be described with reference to FIG. 4. A parking assisting device 101 of Embodiment 2 is, like in Embodiment 1, provided with a controller 102, and a yaw rate sensor 3, a function selecting switch 4, a monitor 5 and a speaker 6, each of which is connected to the controller 102. The interior of the controller 102 is provided with a navigation function control unit 102a and a parking assisting function control unit 102b. A voice generation function unit 102c is provided as an area shared by the navigation function control unit 102a and the parking assisting function control unit 102b. The voice generation function unit 102c is a voice generation function unit provided in a controller of the existing navigation system, which functions to provide navigation information such as map information, position information, and steering information and the like by voice through the speaker 6. In Embodiment 2, another function of the voice generation function unit 102c is to provide information with regard to the vehicle parking mode that is selected with a lateral-parking mode switch 5a or a parallel-parking mode switch 5b on the monitor 5, by means of voice given from the speaker 6. That is, the voice generation function unit 102c is a unit in which a function of generating voice information with regard to the vehicle parking mode is incorporated in the existing voice generation function unit of the navigation system. For example, by adding a software for realizing a function of generating voice information with regard to the vehicle parking mode to the controlling software of the navigation system, the voice generation function unit 102c can be constructed without addition of hardware.

Accordingly, in Embodiment 2, in addition to the provision of the parking assisting information described in Embodiment 1, for example, when a driver selects a parallel-parking mode through the parallel-parking mode switch 5b, the voice generation function unit 102c functions to provide voice information such as "Start guidance on parallel parking." through the speaker 6 when parking operation is started. Therefore, the existing human-machine-interface or the existing control units of the navigation system are employed to achieve the parking assistance with a simple construction and at a low cost.

Embodiment 3

Figure 5:
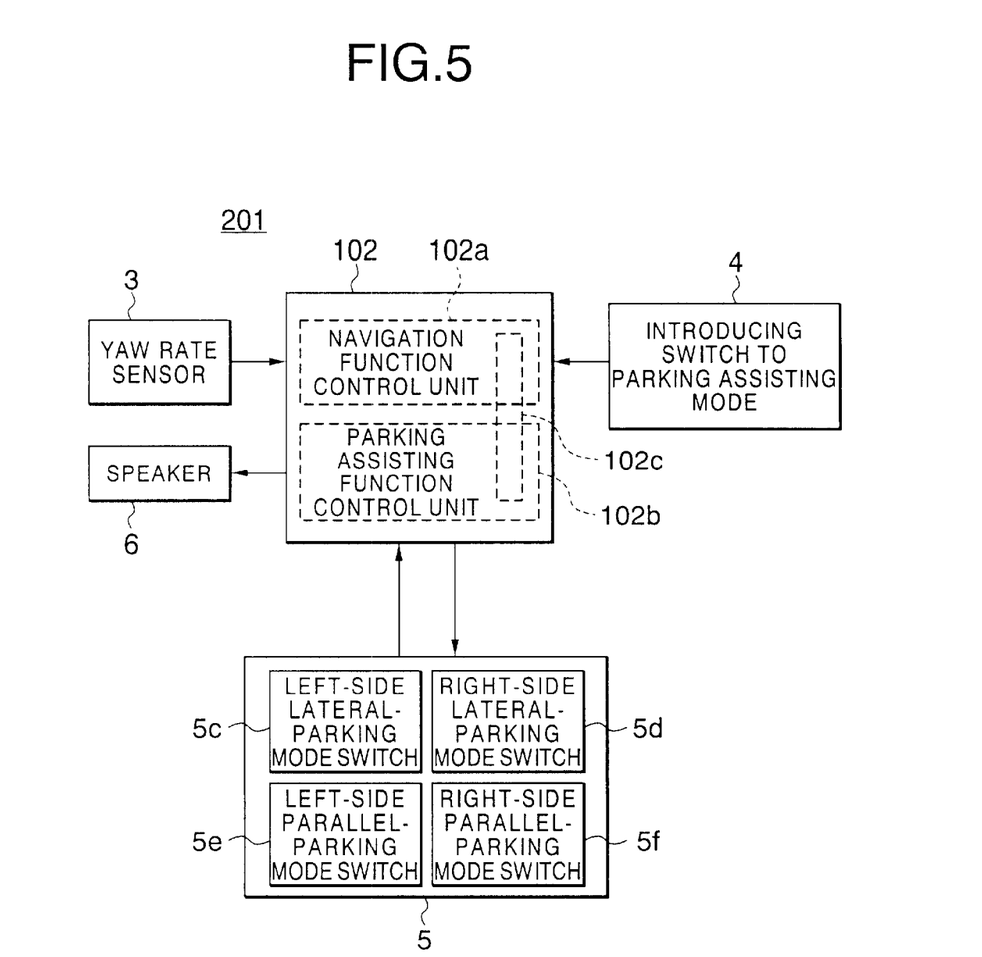
FIG. 5 is a diagram showing a construction of a parking assisting device according to Embodiment 3 of the present invention.

Next, a parking assisting device according to Embodiment 3 of the present invention will be described with reference to FIG. 5.

A parking assisting device 201 of Embodiment 3 is, like in Embodiment 2, provided with a controller 102, and a yaw rate sensor 3, a function selecting switch 4, a monitor 5 and a speaker 6, each of which is connected to the controller 102. In the image display on the monitor 5 of Embodiment 3, a left-side lateral-parking mode switch 5c, a right-side lateral-parking mode switch 5d, a left-side parallel-parking mode switch 5e, and a right-side parallel-parking mode switch 5f are provided as touch switches that are used for informing the controller 102 of the selection of the vehicle parking mode.

Accordingly, in Embodiment 3, in addition to the provision of the parking assisting information that is described in Embodiment 1, for example, when a driver operates the left-side parallel-parking mode switch 5e to select left-side parallel parking, the voice generation function unit 102c functions to provide voice information such as "Start guidance on left-side parallel parking. Turn steering wheel to the maximum rightward and move forward slowly." through the speaker 6 when parking operation is started. Also, by actuating the voice generation function unit 102c, it becomes possible to provide voice parking assisting information such as "Turn steering wheel leftward (vehicle position K1) {rightward (vehicle position L1)} to the maximum. Move backward slowly." at a turning position of steering wheel. (vehicle position K1 or L1 of FIG. 3) Incidentally, it is assumed that the term "left-side parking" refers to the case where the target parking space is positioned at the left side of the own vehicle at the parking start position, in both lateral parking and parallel parking, whereas the "right-side parking" refers to the opposite parking operation. Thus, the existing human-machine-interface or the existing control units of the navigation system are employed to achieve the parking assistance with a simple construction and at a low cost, with the parking assisting device according Embodiment 3. Also, information required for each phase of a parking operation can be instructed by voice.

Embodiment 4

Figure 6:
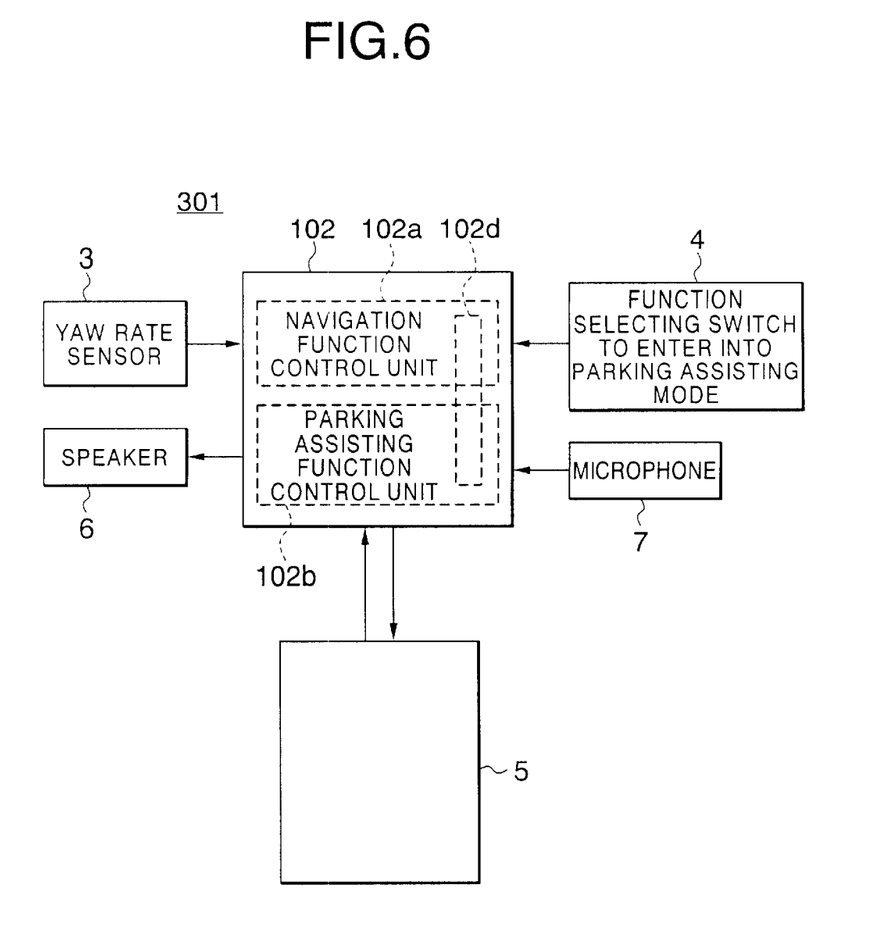
FIG. 6 is a diagram showing a construction of a parking assisting device according to Embodiment 4 of the present invention.

Next, a parking assisting device according to Embodiment 4 of the present invention will be described with reference to FIG. 6. A parking assisting device 301 of Embodiment 4 is, like in Embodiment 2, provided with a controller 102, and a yaw rate sensor 3, a function selecting switch 4, a monitor 5, and a speaker 6, each of which is connected to the controller 102. The parking assisting device 301 is further provided with a microphone 7 that is connected to the controller 102. The interior of the controller 102 is provided with a navigation function control unit 102a and the parking assisting function control unit 102b. A voice recognition function unit 102d is provided as an-area shared by the navigation function control unit 102a and the parking assisting function control unit 102b. The voice recognition function unit 102d is a voice recognition function unit that is provided in the controller of an existing navigation system, which allows a driver to input navigation function instructions such as designation of destinations and arrival times by voice. In Embodiment 4, the voice recognition function unit 102d functions such that a driver can input the instruction of the parking mode selection by voice using the microphone 7. That is, the voice recognition function unit 102d is the unit in which a function allowing a recognition of the instruction of the parking mode selection that is inputted by voice is incorporated in an existing voice recognition function unit of the navigation system. For example, by adding a software for recognizing the instruction of the parking mode selection to the controlling software of the navigation system, the voice recognition function unit 102d can be constructed without addition of hardware. Also, the microphone 7 is an existing microphone provided in the navigation system, which allows the driver to voice-input the navigation function instruction, like the voice recognition function unit 102d. Incidentally, the instruction of the parking mode selection which is inputted by voice has a function equivalent to that of the touch switches displayed on the monitor 5 in the above embodiments, that is, it functions to set the reference position of the yaw angle and to select the parking mode.

Accordingly, with such a parking assisting device, in addition to the provision of the parking assisting information described in Embodiment 1, for example, when a driver inputs by voice any one of "left-side lateral parking", "right-side lateral parking", "left-side parallel parking", and "right-side parallel parking" to the microphone 7, an appropriate parking mode is selected by the voice recognition function unit 102d in the controller 102. As a result, the parking assisting information with regard to the selected parking mode is provided through the speaker 6, as in Embodiment 2 or Embodiment 3. Therefore, according to such a parking assisting device, the existing human-machine-interface or the existing control units of the navigation system are employed to achieve a parking assistance device that is simply constructed and inexpensive. Also, the information that becomes required for each phase of a driving operation can be instructed by voice. Further, a driver performs less manual operations, so that the driver can better concentrate on his/her driving operation.

Embodiment 5

Figure 7:
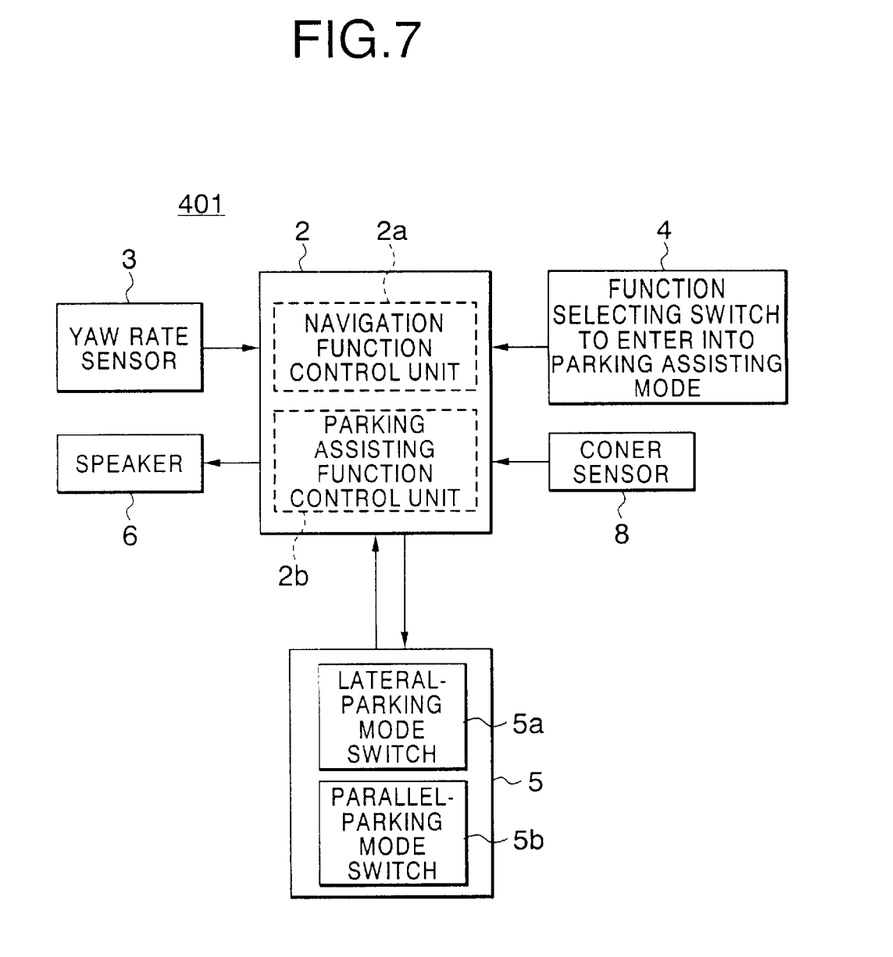
FIG. 7 is a diagram showing a construction of a parking assisting device according to Embodiment 5 of the present invention.

Next, a parking assisting device according to Embodiment 5 of the present invention will be described with reference to FIG. 7.

A parking assisting device 401 of Embodiment 5 is, like in Embodiment 1, provided with a controller 2, and a yaw rate sensor 3, a function selecting switch 4, a monitor 5 and a speaker 6, each of which is connected to the controller 2. Further, a corner sensor 8 connected with the controller 2 is provided therewith. An existing corner sensor mounted to a vehicle is employed as the corner sensor 8.

In such a parking assisting device, in addition to the provision of the parking assisting information described in Embodiment 1, when interference with another car or an obstacle is likely to be caused during parking operation, a signal from the corner sensor is used to urge a driver to take caution by giving an alarm by means of some method. The voice information such as "Fear of interference with an obstacle in the left forward" is given through the speaker 6. Incidentally, the alarm generation sensor used herein is not limited to the corner sensor in Embodiment 5, and a wide range of other alarm generation sensors may be applicable. According to Embodiment 5, the sensor may operate in cooperation with other sensors mounted originally to a vehicle, so that various signals from a vehicle may be utilized to provide more detailed parking assisting information, which was difficult to achieve in the parking assisting device provided as an independent device.

Embodiment 6

Figure 8:
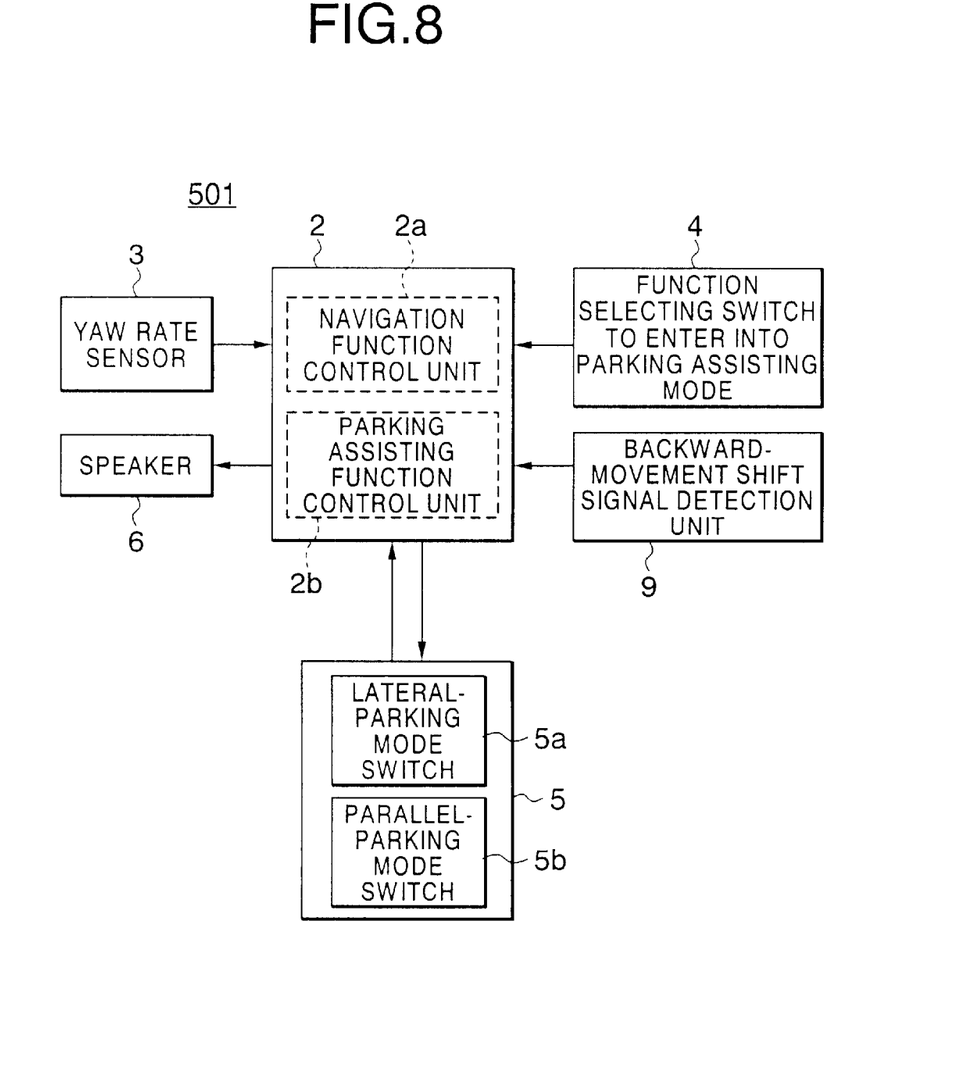
FIG. 8 is a diagram showing a construction of a parking assisting device according to Embodiment 6 of the present invention.

Next, a parking assisting device according to Embodiment 6 of the present invention will be described with reference to FIG. 8. A parking assisting device 501 of Embodiment 6 is, like in Embodiment 1, provided with a controller 2, and a yaw rate sensor 3, a function selecting switch 4, a monitor 5, and a speaker 6, each of which is connected to the controller 2. Further, a backward-movement shift signal detection unit 9 connected with the controller 2 is provided therewith. An existing unit mounted to a vehicle is employed as the backward-movement shift signal detection unit 9, by which information signals indicating whether a vehicle shift is in a forward-movement state or a backward-movement state are transmitted to the controller 2.

Figure 2:
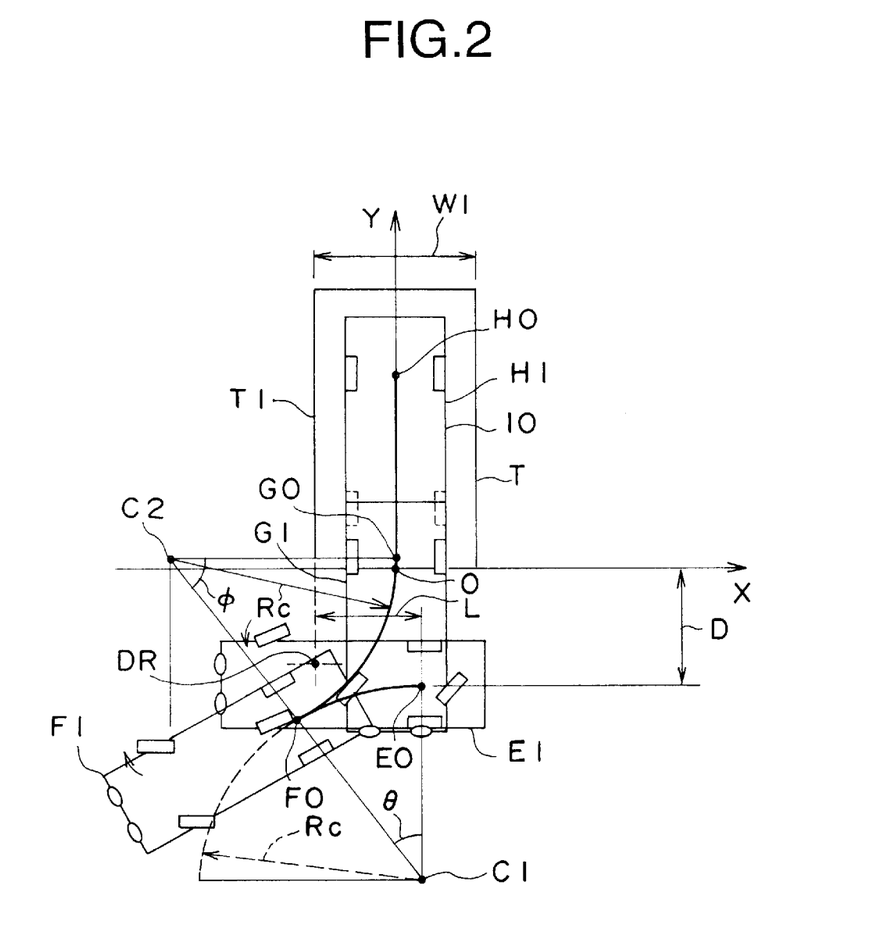
FIG. 2 is a view illustrating stepwise and schematically vehicle positions in lateral parking.
Figure 3:
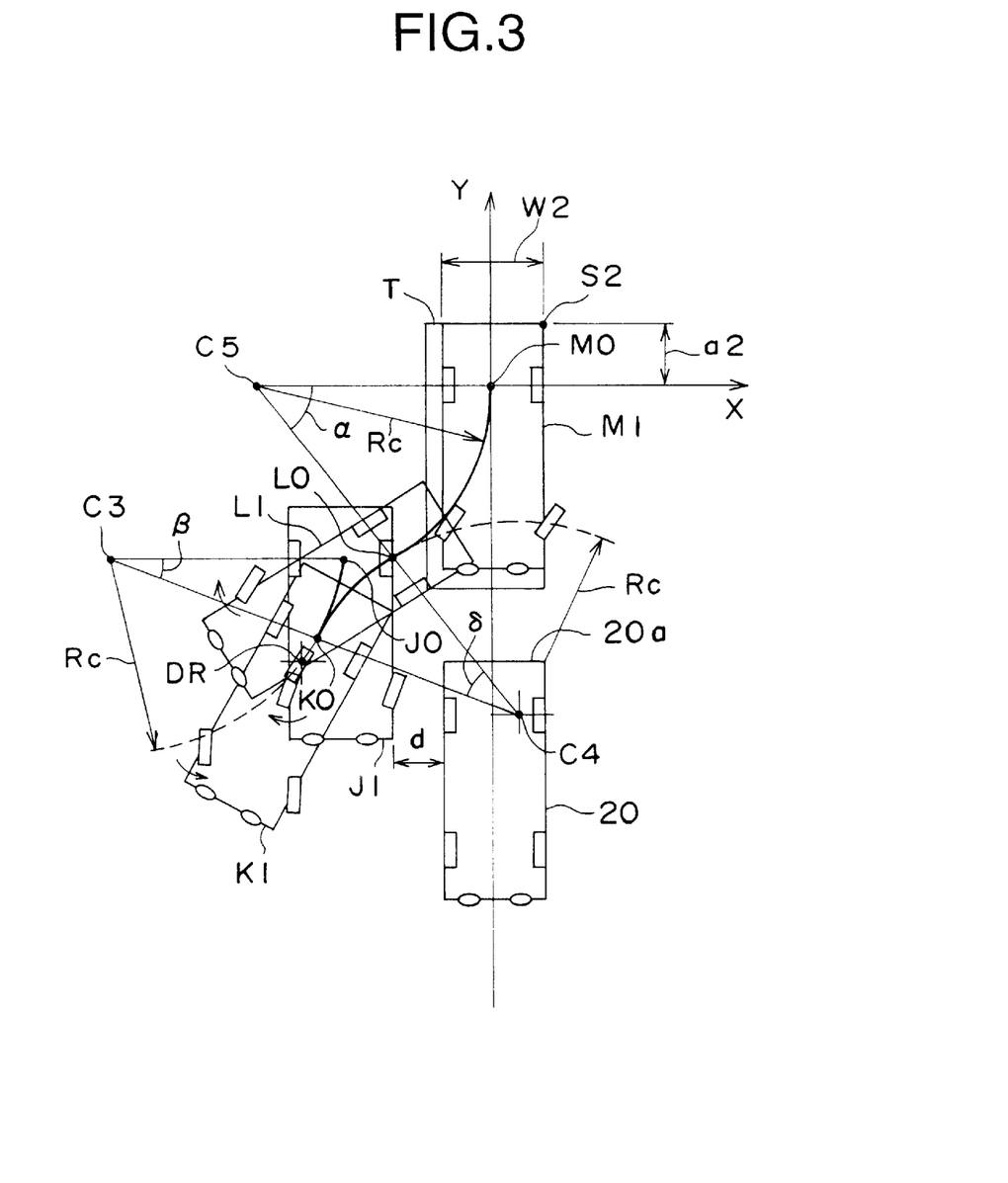
FIG. 3 is a view illustrating step wise and schematically vehicle positions in parallel parking.

In such a parking assisting device, in addition to the provision of the parking assisting information described in Embodiment 1, there is provided information indicating whether a vehicle is being properly turned in accordance with the steps shown in FIG. 2 or FIG. 3, as one of the parking assisting information. That is, for example, in the parallel-parking steps shown in FIG. 3, the vehicle yaw angles increase in both the abnormal state where a vehicle is advancing past the position K1 and the normal state where the vehicle moves backward from the position K1 to the position L1. However, in Embodiment 6, the information on whether the current movement is forward or backward is transmitted to the controller 2 by the backward-movement shift signal detection unit 9, with the result that the controller 2 makes a judgment as to whether proper vehicle turning operations are being performed, by taking into consideration not only the increase/decrease of the vehicle yaw angle but also the backward-movement shift signal, and on the basis of this judgement the controller 2 provides the parking assisting information regarding whether the desired, proper vehicle turning operations are being performed. Thus, according to Embodiment 6, the existing human-machine-interface or the existing control units of the navigation system are employed to achieve a parking assistance device that is simply constructed and inexpensive. Also, there can be provided the parking assisting information as to whether proper vehicle turning operations are being performed as desired.

Other Embodiments

Note that, the present invention is not limited to the above-described embodiments. The following modification may be made to implement the present invention. First, the function selecting switch may not necessarily be provided independently from a touch switch used to select a parking mode. That is, an alternative embodiment may be such that a touch switch used to select a parking mode is always displayed on a monitor, and an instruction for switching from a navigation mode to a parking assisting mode, a setting instruction of the reference position of a yaw angle, and a selection instruction of the parking mode, are outputted together to a controller by actuating the touch switch. Also, the function of either the function selecting switch or the touch switch used to select the parking mode, or the functions of both of them, can be realized by means of voice-input.

As described above, in the parking assisting device according to the present invention, an appropriate parking assistance is attained and a driving operation can be appropriately guided during a parking operation without placing a heavy load on a driver. Also, the parking assisting function is integrated with the navigation system, so that the existing human-machine-interface or the existing control units of the navigation system are employed to achieve the parking assistance device that is simply constructed and inexpensive.

What is claimed is:

1. A parking assisting device, comprising:

a first means for detecting a yaw angle of a vehicle;

a controller having a navigation function control unit and a parking assisting function control unit;

a second means for determining switching from a navigation mode to a parking assisting mode;

a third means for providing navigation information, and for setting the reference position of the yaw angle and selecting a parking mode; and a fourth means for providing parking assisting information to a driver in accordance with a vehicle position specified on the basis of the yaw angle.

2. A parking assisting device according to claim 1, wherein the parking assisting information includes information instructing a driver to move a vehicle forward or backward while keeping a constant steering angle, and then to perform a steering operation to the opposite direction under a standstill state to move the vehicle backward while keeping a constant steering angle, whereby the vehicle can be finally parked in the target parking space.

3. A parking assisting device according to claim 1, wherein a fifth means capable of receiving, by voice-input, a navigation function instruction, a setting instruction of the reference position of the yaw angle, and a selection instruction of the parking mode is provided instead of the third means or with the third means.

4. A parking assisting device according to claim 1, wherein the controller includes a voice generation function unit for giving voice-guidance on the navigation information and on the information related to the parking mode that is selected by the third means.

5. A parking assisting device according to claim 3, wherein the controller includes a voice generation function unit for giving voice-guidance on the navigation information and on the information related to the parking mode that is selected by the fifth means.

6. A parking assisting device according to claim 1, wherein the third means is capable of performing a selection between parallel parking and lateral parking and a selection between left-side parking and right-side parking as the parking mode.

7. A parking assisting device according to claim 3, wherein the fifth means is capable of performing a selection between parallel parking and lateral parking and a selection between left-side parking or right-side parking as the parking modes.

8. A parking assisting device according to claim 1, further comprising an alarm generating sensor, wherein an alarm generated by the alarm generating sensor is provided from the fourth means.

9. A parking assisting device according to claim 1, further comprising a backward-movement shift signal detection unit, wherein the controller makes a judgment whether a desired normal vehicle turning operation is being performed by taking into consideration the backward-movement shift signal generated by the backward-movement shift signal detection unit, and the fourth means provides the parking assisting information as to whether the desired normal vehicle turning operation is being performed.

10. A parking assisting device according to claim 1, wherein:

the first means, the second means, the third means, and the fourth means respectively include a yaw rate sensor, a function selecting switch, a monitor, and a speaker; and the monitor selectively displays one of navigation information and a touch switch that is used for selecting the parking mode of a vehicle, in accordance with the operation of the function selecting switch.

* * * * *

UNITED STATES PATENT AND TRADEMARK OFFICE
CERTIFICATE OF CORRECTION

PATENT NO. : 6,711,473 B2
DATED : March 23, 2004
INVENTOR(S) : Shimazaki et al.

It is certified that error appears in the above-identified patent and that said Letters Patent is hereby corrected as shown below:

Column 1,
Line 24, please delete "steeling" and insert therefore -- steering --;

Column 4,
Line 6, please delete "to they axis" and insert therefore -- to the Y axis --;

Column 6,
Line 49, please delete "sin β=2Rc" and insert therefore -- sin β= –2Rc --.

Signed and Sealed this

Tenth Day of August, 2004

JON W. DUDAS
*Acting Director of the United States Patent and Trademark Office*